United States Patent [19]
Casse

[11] 4,165,113
[45] Aug. 21, 1979

[54] MULTICELLULAR ELASTOMERIC SHOCK-ABSORBING DEVICE

[75] Inventor: Christian Casse, Paris, France

[73] Assignee: Paulstra, France

[21] Appl. No.: 908,140

[22] Filed: May 22, 1978

Related U.S. Application Data

[63] Continuation of Ser. No. 760,350, Jan. 18, 1977, abandoned.

[30] Foreign Application Priority Data

Jan. 27, 1976 [FR] France ................................ 76 02141

[51] Int. Cl.$^2$ ........................ B60R 19/06; F16F 1/36; F16F 1/44
[52] U.S. Cl. .................................. 293/121; 188/1 C; 293/120
[58] Field of Search .................. 293/70, 71 R, 72, 60, 293/71 P, 85-86, 88, 98, 87, DIG. 3, 89, DIG. 5; 267/139-141; 188/1 C; 114/219

[56] References Cited

U.S. PATENT DOCUMENTS

| | | | |
|---|---|---|---|
| 2,728,479 | 12/1955 | Wheeler | 188/1 C |
| 3,506,295 | 4/1970 | Yancey | 188/1 C X |
| 3,871,636 | 3/1975 | Boyle | 293/60 X |
| 3,997,207 | 12/1976 | Norlin | 293/71 R |

Primary Examiner—Douglas C. Butler
Attorney, Agent, or Firm—Larson, Taylor & Hinds

[57] ABSTRACT

A shock-absorbing device, such as a vehicle fender, comprises an assembly of interconnected elastomeric cells. The cells are arranged to extend at right angles to the forces to be absorbed and have a polygonal cross-section. The cells are formed so that, in absorbing forces, the device is initially resiliently deformed, then deformed by buckling of the cell walls and finally compressed.

10 Claims, 10 Drawing Figures

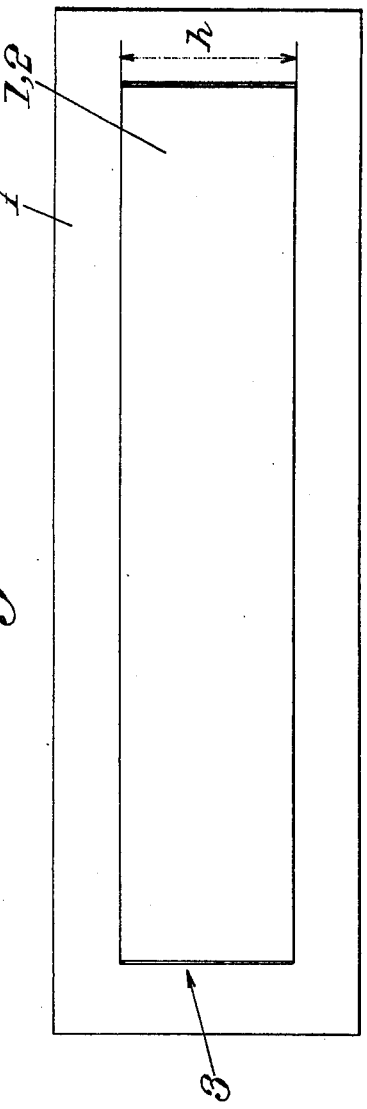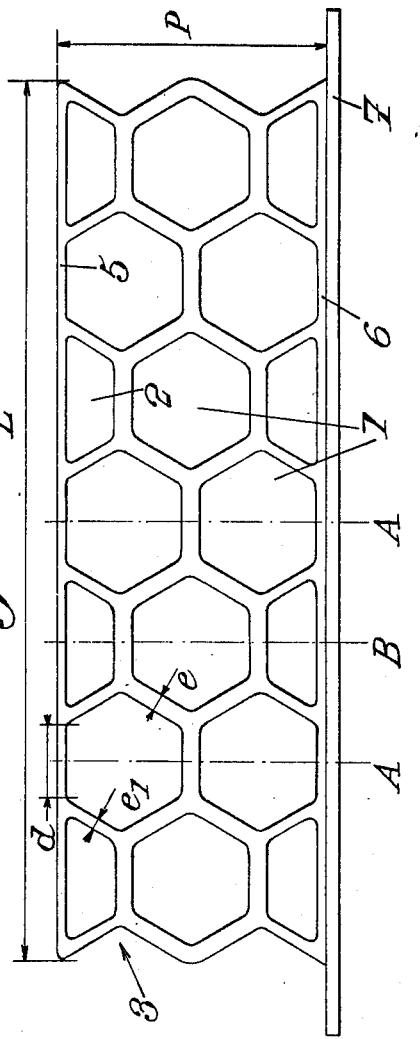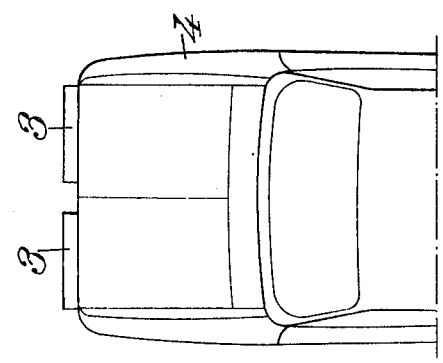

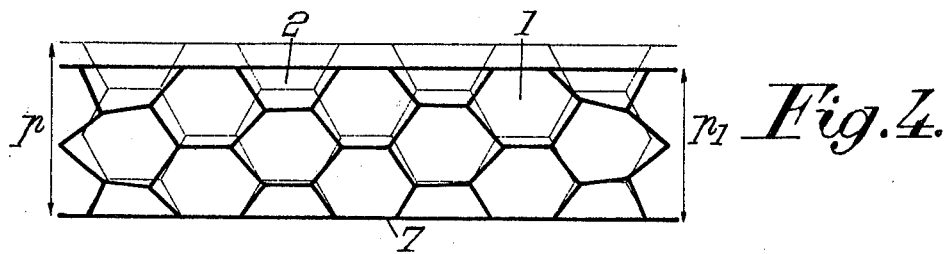
Fig. 4.
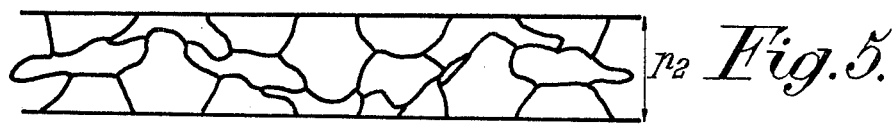
Fig. 5.
Fig. 6.
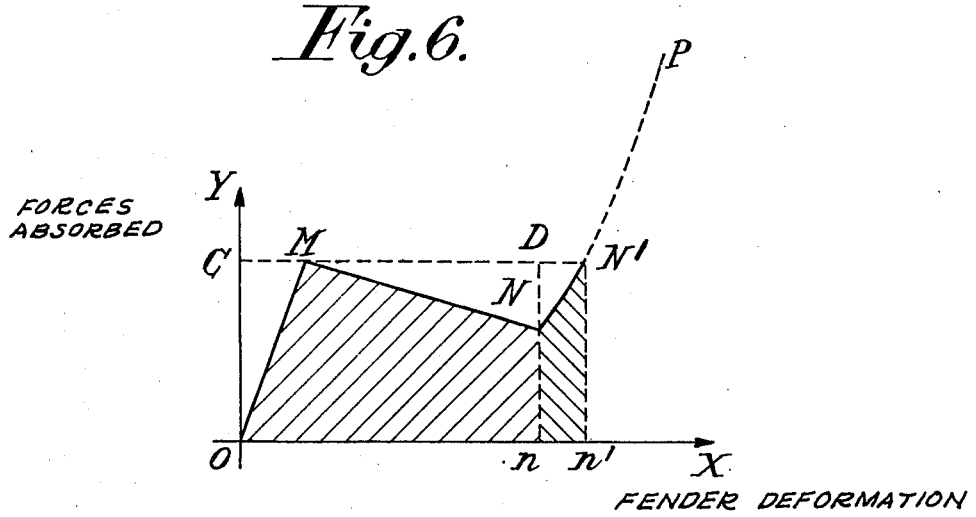
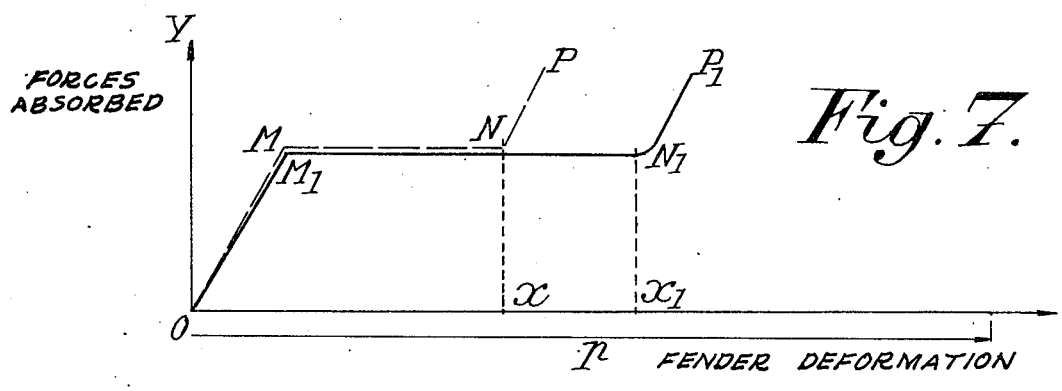
Fig. 7.

MULTICELLULAR ELASTOMERIC SHOCK-ABSORBING DEVICE

This is a continuation, of application Ser. No. 760,350 filed Jan. 18, 1977, now abandoned.

BACKGROUND OF THE INVENTION

The invention relates to a shock-absorbing device, inter alia for absorbing impact energy (the latter term being non-limiting and being applicable inter alia to vibrations). The invention finds particular application in the construction of vehicle fenders.

The main object of the invention is to increase the absorption possibilities of such shock-absorbing devices.

SUMMARY OF THE INVENTION

According to the invention, a shock-absorbing device is made of an assembly of elastomeric cells having generatrices extending at right angles to the forces to be absorbed, the cells having a polygonal section and being interdependent, i.e., having common walls; when shocks are absorbed, the assembly first operates elastically and then mainly by deformation due to buckling, up to complete compression.

Consequently, shocks are absorbed mainly by buckling. If the curve of the forces applied at each instant to a vehicle or structure bearing the fender is drawn in dependence on the deformation of the elastomer, the curve has a plateau corresponding to the energy of the absorbed impact. During this plateau, the forces absorbed remain almost constant. Consequently, the invention ensures that, at a given impact energy (corresponding e.g. to a predetermined low speed of the vehicle), the force applied to the vehicle will not exceed a dangerous limit.

The cells, which are substantially open i.e., open at the top and/or bottom of the cells, so that air can escape during deformation resulting from energy absorption, may have, for example, a hexagonal section.

A two-cell network can be provided in the thickness direction, in the direction of the force, so that in the longitudinal direction at right angles to the force, there are alternate pairs of juxtaposed cells, followed by a central cell between two half-cells, then by again two cells and so on.

The cells walls can have variable thickness, said walls being thicker in the central region and thinner in the two adjacent regions.

It is envisaged that the shape and thickness of the walls or other factors may be varied in order to facilitate and prolong the buckling action.

Further objects and advantages of the invention will appear from the following description of preferred embodiments, given with reference to the appended drawings.

BRIEF DESCRIPTION OF THE DRAWINGS

In the drawings:

FIG. 1 is a diagrammatic plan view of part of a vehicle provided with fenders according to the invention;

FIGS. 2 and 3 are diagrams, in horizontal projection and end view respectively, of a fender component constructed according to the invention;

FIGS. 4 and 5 are diagrams in section showing two successive phases in the deformation, under an impact, of a cellular elastomeric unit of the kind shown in FIG. 2;

FIGS. 6 and 7 are two graphs illustrating the operation of such a unit;

DESCRIPTION OF THE PREFERRED EMBODIMENTS

Figure 8:
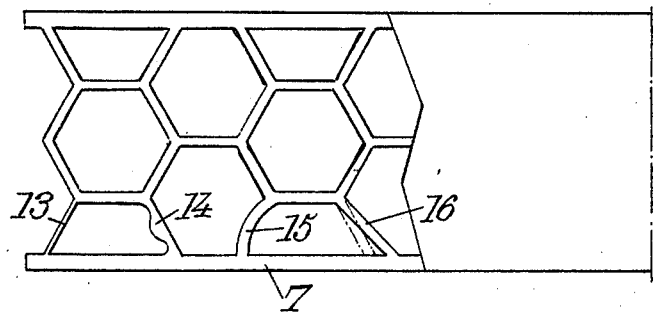
FIG. 8 diagrammatically illustrates a number of modifications which may be made to such a unit, so as to vary the deformation properties during buckling.

Referring to the drawings, each shock-absorbing device shown therein comprises a three-dimensional elastomeric assembly in the form of a network of cells such as 1, 2 having generatrices extending at right angles to the direction of the forces to be absorbed, e.g. vertically in the case of a fender. Stated differently, the line generators (longitudinal axes) for the cells 1, 2 are perpendicular to the plane of drawings and would be oriented vertically for forces perpendicular to line L.

Since the forces are usually in the horizontal direction, the cells comprise walls which, when the fender (such as 3 in FIG. 1) is fixed on the vehicle chassis 4, extend vertically, constituting hollow prisms (FIGS. 2, 4, 5).

Advantageously, the cells have a horizontal cross-section and are in at least two rows in the direction of the depth p direction (FIG. 2) so that, in successive transverse regions such as A,B,A, etc., regions A contain two complete cells 1 and regions B contain a complete cell 1 between two half-cells 2.

The assembly is bounded by a front wall 5 and a rear wall 6, which can be secured to a holder 7 (or $7_1$, FIG. 9) by any suitable means for connection to the vehicle chassis the holder being secured to the rear wall 6 as illustrated in FIG. 2.

The dimensions of the assembly, i.e. the depth p and the height h of the cells and the wall thickness e, may advantageously be chosen in dependence on the desired absorption curve and the amount of energy to be absorbed. Advantageously, the wall thickness c may be made less for the half-cells 2 than for the complete cells 1, as shown at $e_1$ in FIG. 2. As shown in FIG. 2, the cells form a honeycomb configuration and as shown in FIG. 3, are continuous from top to bottom.

By way of example only, two fenders mounted at the front of a private vehicle and made of elastomer, e.g. polyurethane having a Shore hardness of 50 to 60 D, were given the following dimensions, the imposed condition being that the vehicle should without damage withstand an impact at a speed of the order of 8 to 10 km/h.

Length L of each component (in the case of two components): of the order of 650 mm.

Width d of the cell sides: approximately 50 mm.

Horizontal depth p of bumper: approximately 180 mm.

Height h of cells: approximately 120 mm.

Wall thickness e: approximately 12 mm.

Minimum wall thickness $e_1$: approximately 8 mm.

It can be seen that, in this example, the maximum thickness e is about a quarter of the width of the sides, although this is by way of example only.

The minimum thickness $e_1$ is usually of the order of 25 to 50% less than the maximum thickness e, although this is not critical. The operation of the resulting fender is clear from the curves in FIGS. 6 and 7, in which the abscissa OX indicates the fender deformation and the ordinate indicates the forces absorbed by the holder of the fender, i.e. by the vehicle.

The absorption of an impact comprises an initial elastic phase during which the assembly retains its overall cellular shape. This phase corresponds to a very steep, substantially straight curve OM. Advantageously curve OM is as steep as possible, in view of the special construction of the cellular unit.

The deformation occurring in this first phase is illustrated in FIG. 4, in the transition from the thin line to the thicker line.

In the case of relatively strong impacts,, the first phase is followed by the buckling phase, illustrated in FIG. 5, i.e. a deformation of the structure by modification of the shape of the cell walls. The nodes rotate around their generatrices and the walls are bent into a curve, as shown in the drawing.

The buckling corresponds to the flattening of the curve at MN (FIGS. 6 and 7), i.e. a plateau, after which the curve rises again at NNP.

Plateau MN can vary according to the dimensions of the cell walls (i.e. their length, number height, thickness and shape), and optimum dimensions for the desired purpose can be chosen by experience. FIG. 6 shows a slightly descending plateau but advantageously, the plateau is made parallel to OX, as shown in FIG. 7, since it is known that the area beneath the plateau, as shaded under the line OMNN' of FIG. 6, represents the impact energy at which the force applied to the vehicle or structure remains substantially constant. If the area is large, the vehicle can absorb correspondingly greater impacts without damage.

The inclined portion MN (FIG. 6) corresponds to a special case only; the cells can be dimensioned so that portion MN is substantially parallel to the OX axis, as shown in FIG. 7 at MN or $M_1N_1$.

FIG. 8 is a diagrammatic illustration of various means of improving the curve and increasing the plateau and thus increasing the buckling possibilities. As can be seen from FIG. 8, the following, inter alia, can be varied:

the thickness of some walls, as shown at 13 where one wall has been made thinner, the shape of the walls, as diagrammatically illustrated at 14 where a bead facilitating buckling has been provided, or at 15 where the walls are curved, or the wall inclination has been varied, as shown at 16 in FIG. 8.

Of course FIG. 8 is diagrammatic only and is adapted to illustrate various features which can be used separately.

Figure 9:
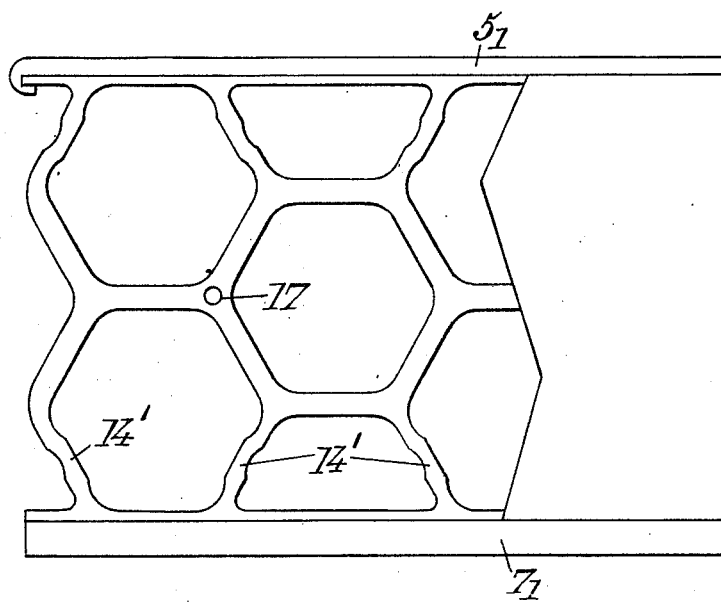
FIGS. 9 and 10 illustrate, in the same manner as FIG. 2, two other embodiments of a cellular unit according to the invention.

FIG. 9 shows a more concrete embodiment comprising beads 14'. The set of fenders is protected at the front by a protective metal frame $5_1$, the rear holder on the vehicle having the reference $7_1$.

FIG. 9 also illustrates the provision of holes 17 at the cell nodes, so as to increase their deformability.

These various additional means of facilitating buckling can be used to obtain deformation due to buckling over a considerable proportion of the depth p of the elastomeric unit. For example the deformation Ox (FIG. 7) will be approximately 0.4 p in the case of a unit as described in FIG. 2, but can be increased to 0.6 p or more by using means such as shown inter alia on FIG. 9. OMNP represents the curve obtained for a unit of the kind in FIG. 2, whereas the curve becomes $OM_1N_1P_1$ when the unit is formed as in FIG. 9 or in similar manner.

Figure 10:
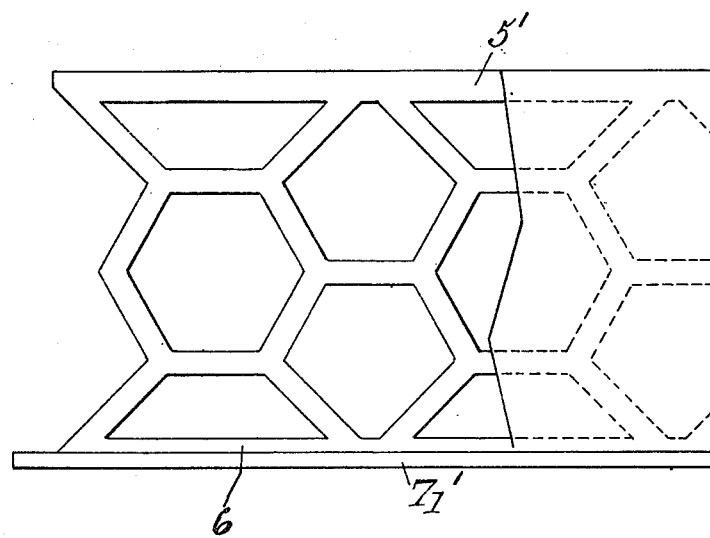

The hexagonal shape is in no way indispensable, as shown by the variant in FIG. 10, in which the cross-section is pentagonal, some pentagon apices being disposed on front walls 5' and rear wall 6'.

The cells are open at their ends, at the top and bottom so that air is not compressed during deformation. However, there is no reason that elastomeric or other covers cannot be provided for at least partly closing the cells at the aforementioned ends. There is no reason, incidentally, against partly compressing the air in the cells.

Instead of extending at right angles to the length of the device, i.e. vertically when applied to fenders, the cells can extend in the longitudinal direction, i.e. horizontally in the present application, or may even extend obliquely.

The application to fenders, which has been described more specifically hereinbefore, is the most promising since all the impact energy can be absorbed in a relatively small volume, in the case of impacts at low speed and a given maximum absorbed force, without causing any damage to the vehicle. However, this application is by no means the only possible application.

More particularly, shock-absorbing devices according to the invention are of value in all cases in which it is necessary to absorb not only the energy of impact but also vibrations. The elastic absorption phase, corresponding to the curve portion OM, is such that vibratory forces can be easily absorbed.

In an interesting application in this connection, devices embodying the invention may act as supports inserted between a vehicle chassis 8 and a container or other load borne by the chassis. During a first or elastic phase (curve OM) the supports absorb all the vibratory phenomena. In the second phase and the beginning of the third phase, if any, the supports can absorb impacts due to abrupt stops or any other causes.

The shock-absorbers may also be used as mountings for engines or other devices, e.g. for boat engines, or as suspension devices for vehicles.

Compared with existing devices of the same kind, devices embodying the invention have numerous advantages, inter alia:

the possibility of absorbing maximum energy for a given bulk.

suitability for many different applications;

the possibility of absorbing not only impacts but also vibrations; and relative ease of manufacture.

Various modifications can be made in the above described embodiments of the invention. For example, the two bumpers shown in FIG. 1 may be replaced by a single fender extending all the way across the vehicle.

I claim:

1. A multi-cellular shock absorbing device for absorbing shocks transmitted between first and second members in a given direction, said device having a top and a bottom and comprising a plurality of interdependent three-dimensional elastomeric cells arranged in a honeycomb pattern and affixed to one of said members, each said cell having a longitudinal axis, being polygonal in transverse cross section, having side walls, and being disposed such that, in use, the longitudinal axis thereof extends vertically, transversely to the direction of the shocks to be absorbed the side walls of the cells of said honeycomb pattern being continuous from the top of the device to the bottom thereof so that, in use, said device, as viewed in the direction of the shocks to be absorbed, is formed by a single row of vertically extending cells, and the arrangement of said cells including at least two complete cells arranged serially in the direction of the shocks to be absorbed and at least one complete cell and two half cells arranged serially in said direction and formed ingetrally with, and disposed laterally of, said two complete cells.

2. A device according to claim 1, wherein said cells deform as a function of impact forces absorbed thereby and said complete cells are disposed in such a manner that two sides of each complete cell are perpendicular to the direction of the shocks to be absorbed and the other sides are oblique to this direction, the device exhibiting, at the time when the shocks are received, a characteristic response curve for deformation as a function of the absorbed impact forces wherein the curve includes a first part which generally rises at an oblique angle and corresponds to an elastic deformation of the complete cells, and a second part which is generally horizontal and corresponds to a buckling of the complete cells about the edges thereof.

3. A device according to claim 2 wherein said complete cells comprise at least one row of polygonal cells.

4. A device according to claim 2 wherein said complete cells comprise at least one row of polygonal cells and at least one adjacent row of pentagonal cells.

5. A device according to claim 2 wherein said complete cells comprise at least one central row of hexagonal cells and at least two rows of hexagonal cells located opposite sides of said central row in staggered relationship thereto.

6. A device according to claim 1 further comprising means for facilitating deformation of the cells due to buckling.

7. A device according to claim 1, wherein said complete cells include outermost walls and walls located inwardly of the outermost walls and the walls of said complete cells located inwardly of the outermost walls of the complete cells have a thickness "e" which is on the order of one fourth of the transverse distance between the sides of the complete cells; and the outermost walls of the complete cells have a lesser thickness on the order of "e/2".

8. A device according to claim 1, wherein holes are provided in at least some of the cell wall locations which are common to several adjacent cells so as to promote buckling of the cell walls.

9. A device according to claim 1, wherein the walls of a plurality of the all of the cells include a protruding portion for promoting buckling of the said cells.

10. A device according to claim 1, wherein said cells deform as a function of impact forces absorbed thereby and said complete cells are hexagonal in cross section and are disposed in such a manner that two sides of each cell are perpendicular to the direction of the shocks to be absorbed and the other sides are oblique to this direction, the device exhibiting, when the shocks are received, a characteristic response curve for deformation as a function of the absorbed impact forces wherein the curve includes a first part which generally rises at an oblique angle and corresponds to an elastic deformation of the cells, and a second part which is generally horizontal and corresponds to a buckling of the walls of the cells about their edges, the horizontal portion of the response curve, in the direction of the displacement of the device, reaching a depth of at least about 60% of the total thickness of the multi-cellular device.

* * * * *